United States Patent

Marek et al.

[11] Patent Number: 5,461,917
[45] Date of Patent: Oct. 31, 1995

[54] ACCELERATION SENSOR

[75] Inventors: Jiri Marek; Dietrich Schubert, both of Reutlingen; Helmut Baumann, Gomaringen; Horst Muenzel, Reutlingen; Michael Offenberg, Tuebingen; Martin Willmann, Reutlingen, all of Germany

[73] Assignee: Robert Bosch GmbH, Stuttgart, Germany

[21] Appl. No.: 131,821

[22] Filed: Oct. 5, 1993

[30] Foreign Application Priority Data

Oct. 10, 1992 [DE] Germany .......................... 42 34 238.4

[51] Int. Cl.$^6$ ................................. G01P 15/125
[52] U.S. Cl. ................................... 73/514.16
[58] Field of Search ................. 73/517 AV, 517 R, 73/517 B, 526

[56] References Cited

U.S. PATENT DOCUMENTS 4,901,570  2/1990  Chang et al. ..................... 73/517 AV
4,967,597  11/1990 Yamada et al. ....................... 73/516 R
5,090,254  2/1992  Guckel et al. ..................... 73/517 AV
5,181,156  1/1993  Gutteridge et al. .................. 73/517 R
5,228,341  7/1993  Tsuchitani et al. .................. 73/517 R

FOREIGN PATENT DOCUMENTS 0369352  5/1990  European Pat. Off. .

Primary Examiner—Richard E. Chilcot, Jr.
Assistant Examiner—Max H. Noori
Attorney, Agent, or Firm—Kenyon & Kenyon

[57] ABSTRACT

An acceleration sensor and a method of making an acceleration sensor is described in which a movable sensor element is located in a hollow space formed in the middle of three silicon plates. During production, air can be removed from the hollow space through a hole in one of the two outer plates. The hole is then closed by an additional plate, which allows for a defined pressure to be set in the hollow space.

12 Claims, 3 Drawing Sheets

ACCELERATION SENSOR

FIELD OF THE INVENTION

The invention relates generally to acceleration sensors and methods of making acceleration sensors, and more particularly to acceleration sensors made of silicon which have a moveable element.

BACKGROUND OF THE INVENTION

An acceleration sensor is already known from EP A1 369 352 with a middle and two outer silicon plates, in which an element that is moved by acceleration is formed in the middle silicon plate. In this case, the movable element is enclosed in a hollow space in one of three silicon plates. The connection of the middle silicon plate with the two outer plates is made by means of a preliminary treatment of the silicon plates, placing them next to one another, and a final heat treatment at a temperature of 800°–1100° C. in an oxygen or nitrogen atmosphere.

SUMMARY AND ADVANTAGES OF THE INVENTION

The present invention provides an acceleration sensor comprising two outer plates; a middle plate located between the two outer plates, the middle plate and the two outer plates defining a hollow space, the middle plate having an acceleration-sensitive moveable element within the hollow space; one of the two outer plates having a hole, the hole connecting with the hollow space; and an additional plate for closing the hole in an air-tight manner.

The present invention also provides a method for making the acceleration sensor comprising the steps of placing a middle plate having an acceleration-sensitive moveable element between two outer plates so as to form a hollow space with the acceleration-sensitive moveable element therein, the hollow space connecting with a hole in one of the two outer plates; bonding the middle plate to the two outer plates; and attaching an additional plate over the hole.

An advantage of the present invention is that through a hole in the outer wall and the air-tight closure by another plate, a definite pressure can be established in the hollow space.

Advantageous further developments and improvements of the invention described above are also possible. With use of a glass plate or a silicon plate with a surface layer of glass, the pressure in the hollow space can be reproduced with accuracy. The thin layers of glass can be applied by spraying, condensation, or screen printing. The mechanical tensions between the outer plate and the additional plate become especially small when the additional plate consists of a silicon plate with a layer of metallic solder. Through the sequence of steps described, low-temperature processes that do not change the temperature can be used in the soldering. For the least expensive construction of the acceleration sensor, the additional plate can also be used as a connecting plate to the bottom of a casing. By using a small connection region that only covers the hole, mechanical tensions in the sensors are minimized. Here, the additional plate can be made just as large as the connection region, or the additional plate or the outer plate can have the connection region raised on one of its surfaces.

BRIEF DESCRIPTION OF THE DRAWINGS

The present invention is explained in the following description with references to the following figures.

DETAILED DESCRIPTION

Figure 1:
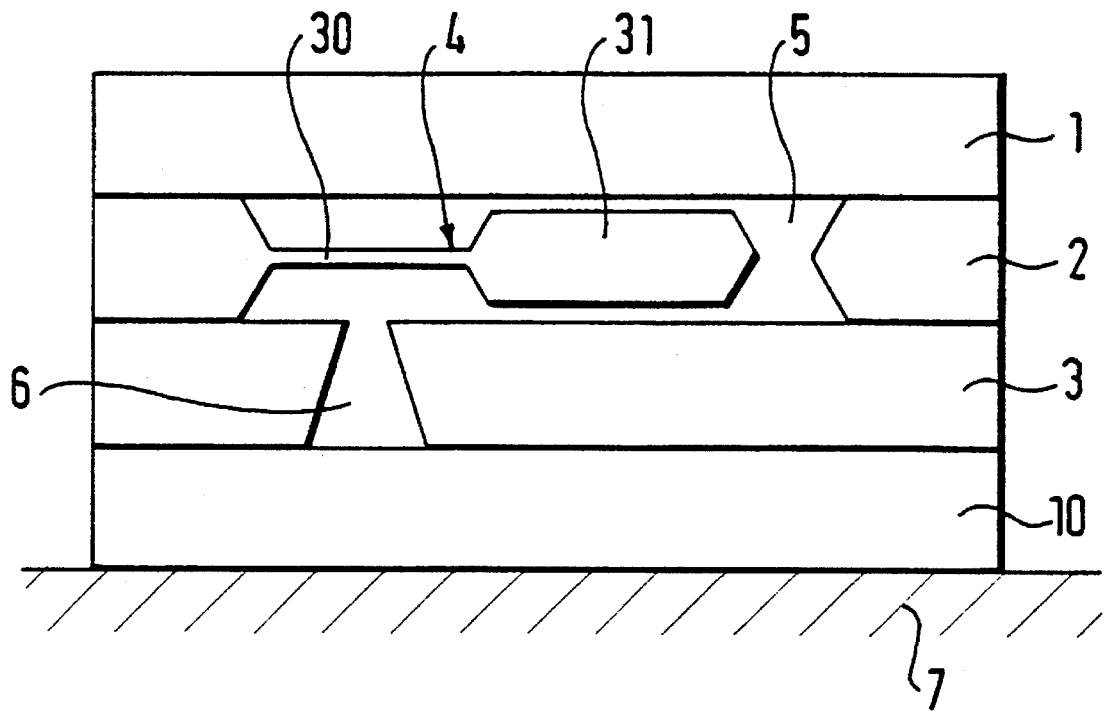
FIG. 1 shows an acceleration sensor with a glass plate as the additional plate.

In FIG. 1 an acceleration sensor is shown that comprises a middle silicon plate 2, two outer silicon plates 1,3, and an additional plate 10. In the middle silicon plate 2, a movable element 4 is formed, which here has the shape of a flexible tongue 30 with a seismic mass 31. This movable element 4 is located in a hollow space 5, which is formed from the middle silicon plate 2 and the two outer silicon plates 1,3. One of the two outer silicon plates 3 has a hole 6. This hole however is closed by the additional plate 6, which is connected to the outer silicon plate 3. Moreover, the acceleration sensor is attached to the bottom of a casing 7.

A complete acceleration sensor is already formed by the middle silicon plate 2 and the two outer silicon plates 1,3. Such acceleration sensors are described, for example, in EP A1 369 352, cited in the introduction. When acceleration occurs, the movable element 4 moves away from the rest position depicted here, i.e. the seismic mass 31 approaches one of the outer silicon plates 1,3. The silicon plates are insulated from one another. As a consequence of the approach of the seismic mass 31 to one of the outer silicon plates 1,3, the capacitance measured between the middle plate 2 and the two outer silicon plates 1,3 changes. This change in capacitance measures the acceleration taking place. The motions of the movable element 4 are damped by the air trapped inside the hollow space 5. Since the distance between the seismic mass 31 and the outer silicon plates 1,3 is small, this air-damping of the motion of the movable element 4 is relatively large. It is therefore desirable to incorporate a defined low pressure in the hollow space 5, since the damping characteristics and thereby also the dynamic behavior of the acceleration sensor are set by this low pressure. A low pressure on the order of 0.01 to 10 mbar, with a reproducibility within 5%, is preferable. In producing the acceleration sensors, air is removed from the hollow space 5 through the hole 6, which is then closed with the additional plate 10. If the hollow space 5 were closed directly by attaching together a middle silicon plate 2 with outer silicon plates 1,3 that have no hole, no defined low pressure could be established in the hollow space 5. This is partly because of the high temperature required for direct connection of the silicon plates. At temperatures on the order of 800°–1100° C., remaining gases possibly present in the hollow space 5 may react with the silicon in plates 1,2,3 or gas molecules that have already reacted with the silicon may be driven back into the hollow space. These reactions can only be predicted or reproduced with great difficulty. A reduction in the temperature to a non-critical temperature range below 800° C. is, as a rule, associated with a worsening of the quality of the connection. Furthermore, direct connection of silicon plates in a vacuum is difficult and results in low yields. To connect the silicon plates 1,2,3, the plates are altered in advance by a chemical pre-treatment process that results in hydrophilic surfaces. In a vacuum, these surfaces change in such a way that the quality of the connection of the silicon plates 1,2,3 would be reduced.

By use of the hole 6 in the outer silicon plate 3 and the additional plate 10, a low pressure that can be reproduced well without problems can be set in the hollow space 5. First, the two outer silicon plates 1,3 are connected to the middle silicon plate, which includes the movable element 4. This connection is made by a high-temperature process on the order of 800°–1100° C., so that this connection is assured of being of high quality. In a further step, this plate combination is then connected to an additional plate 10. The additional plate 10 is a glass plate, which is connected to the silicon-plate stack with so-called anode bonds. For this, the plate stack is placed on the additional plate 10, and the environment of the acceleration sensor is evacuated. The air between silicon plate 3 and the additional plate 10 can escape through the hole 6, so that a definite pressure is achieved in the hollow space 5. By applying an electric voltage on the order of between 30 and 1000 volts, the glass plate 10 is attracted electrostatically to the stack of the three silicon plates 1,2,3. Glass plate 10 is made of a sodium-containing glass, such as the glass commercially available from the Corning Glass company under the name of Pyrex. When treated at a temperature of 200° to 400° C., and under the effect of the electric field, a firm, unbreakable connection is formed between the additional plate 10 and the outer silicon plate 3.

Figure 2:
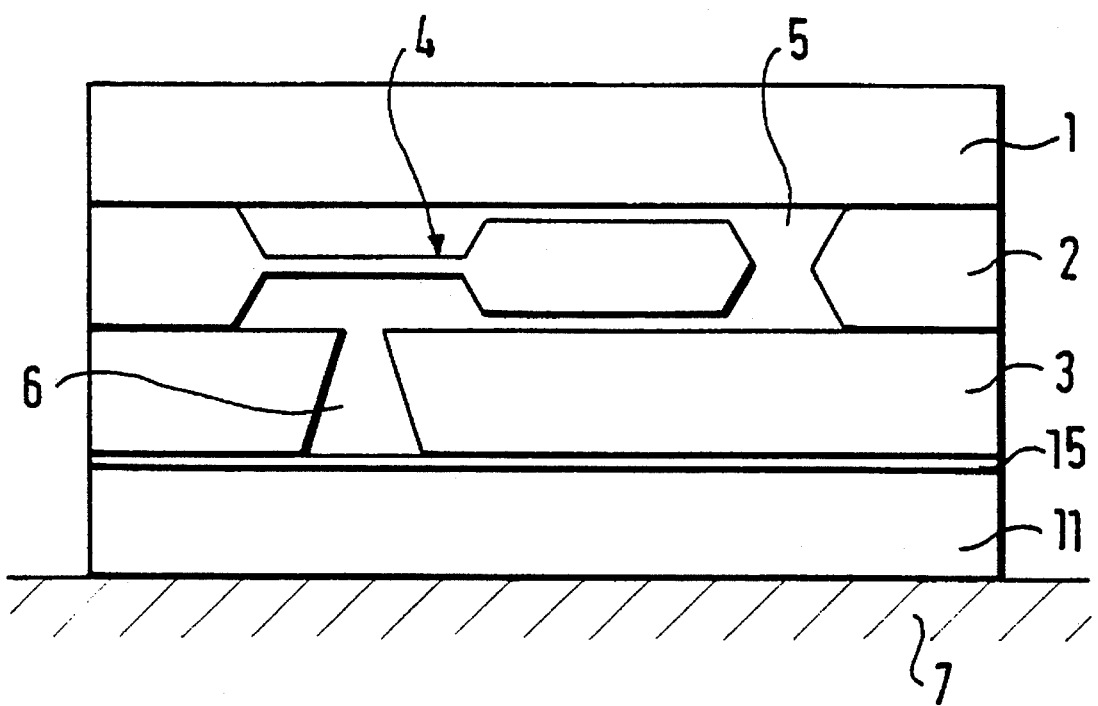
FIG. 2 shows an acceleration sensor with a silicon plate as the additional plate.

In FIG. 2, another embodiment of the acceleration sensor is shown, but it has an additional plate 11 that has a thin surface layer 15. All the other designations, 1 through 7, correspond to the designations in FIG. 1.

The additional plate 11 likewise consists of silicon, and it has on its surface a thin glass layer 15. The thin glass layer 15 likewise consists of a glass material that can be connected to the outer silicon plate 3 with anode bonds. The thin glass layer 15 is produced by spraying, by condensation or by screen printing of a glass-filled paste and then firing at the end. In addition to the advantages already known from FIG. 1, a reduction in mechanical tensions in the acceleration sensor is achieved by use of silicon in the additional plate 11, since the additional plate 11 now has the same thermal characteristics as the three silicon plates 1,2,3.

Figure 3:
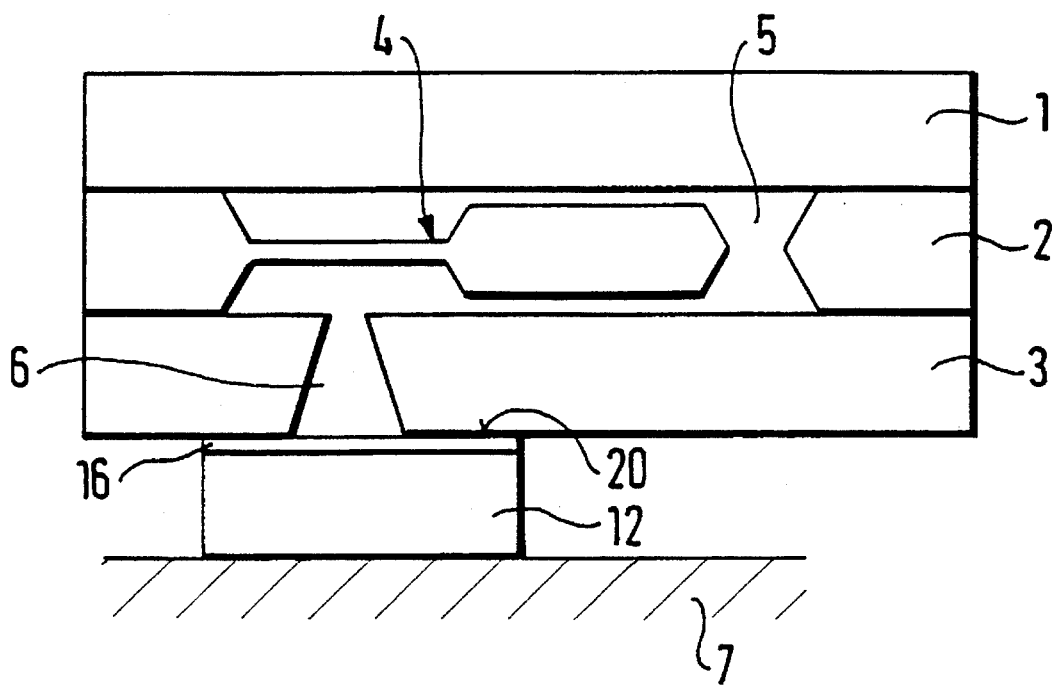
FIG. 3 shows an acceleration sensor with a reduced connection area.

In FIG. 3, another embodiment of the acceleration sensor according to the invention is shown. Numbers 1 through 7 again denote the same sensor parts as in FIG. 1. The additional plate 2 consists of silicon that has a thin film 16 of solder on its surface and is connected at a connection area 20 to the outer silicon plate 3. Because of the small geometric dimensions of the additional plate 12, it is assured that the contact between the three silicon plates 1,2,3 can be extended freely with respect to the casing 7, without thereby creating tensions between the casing 7 and the three silicon plates 1,2,3. By means of these steps, temperature-dependent tensions in the acceleration sensor are also reduced. By selecting a suitable solder material for the solder layer 16, the additional plate 12 can be connected to the outer plate 3 at temperatures on the order of 200°–300° C. A suitable material is, for example, gold, which is suitable for soldering silicon up to a temperature of 370° C. Such a gold layer for connecting the outer silicon plate 3 can also be applied to a glass plate as the additional plate 12 by means of intermediate layers, for example of nickel and chromium.

Figure 4:
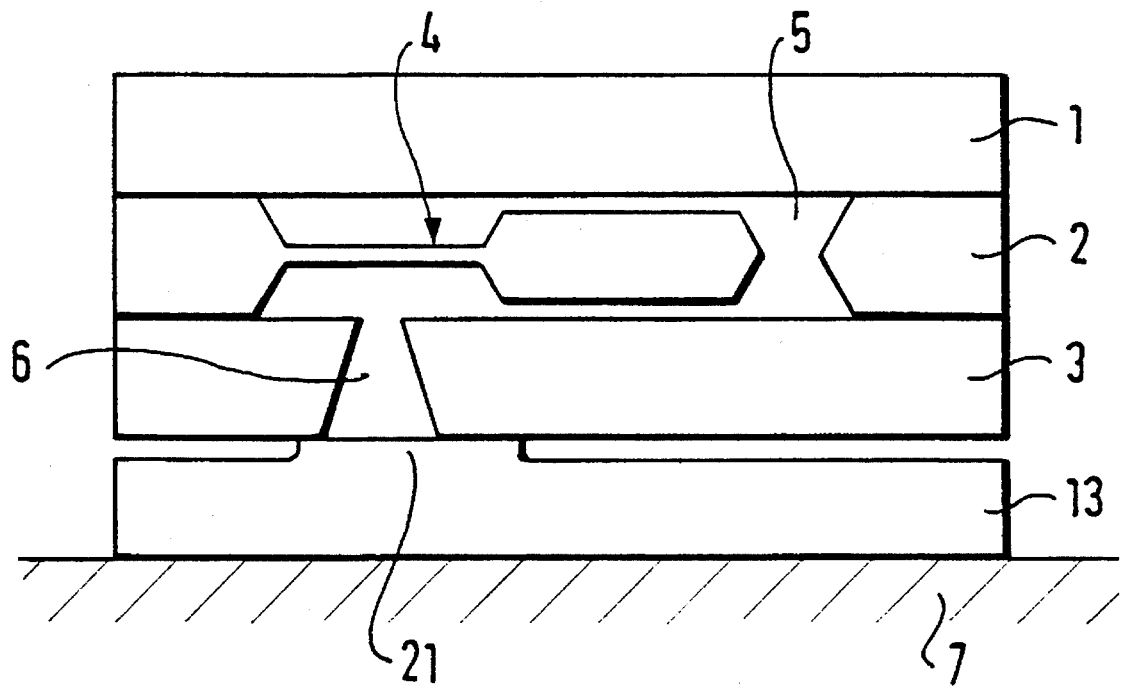
FIG. 4 shows an acceleration sensor with a reduced connection area raised on the surface of the additional plate.

In FIG. 4, another embodiment for an acceleration sensor is shown which has only small temperature-dependent tensions with the casing 7. Numbers 1 through 7 again denote the same sensor parts as in FIG. 1. The additional plate 13 has a connection region 21 on its surface, with which the additional plate 13 is connected to the outer plate 3 in the region around the hole 6. Hole 6 is closed by this connection region. By having this connection region 21 raised, the connection of the three silicon plates 1,2,3 to the region can expand and remain attached during temperature changes without significant mechanical tensions with the additional plate 13 or with the bottom of the casing 7, where these have different thermal coefficients of expansion. By means of the connection region 21, which connects with the additional plate 13 only in the immediate neighborhood of the hole 6, temperature-dependent changes of the sensitivity of the sensor are reduced.

Figure 5:
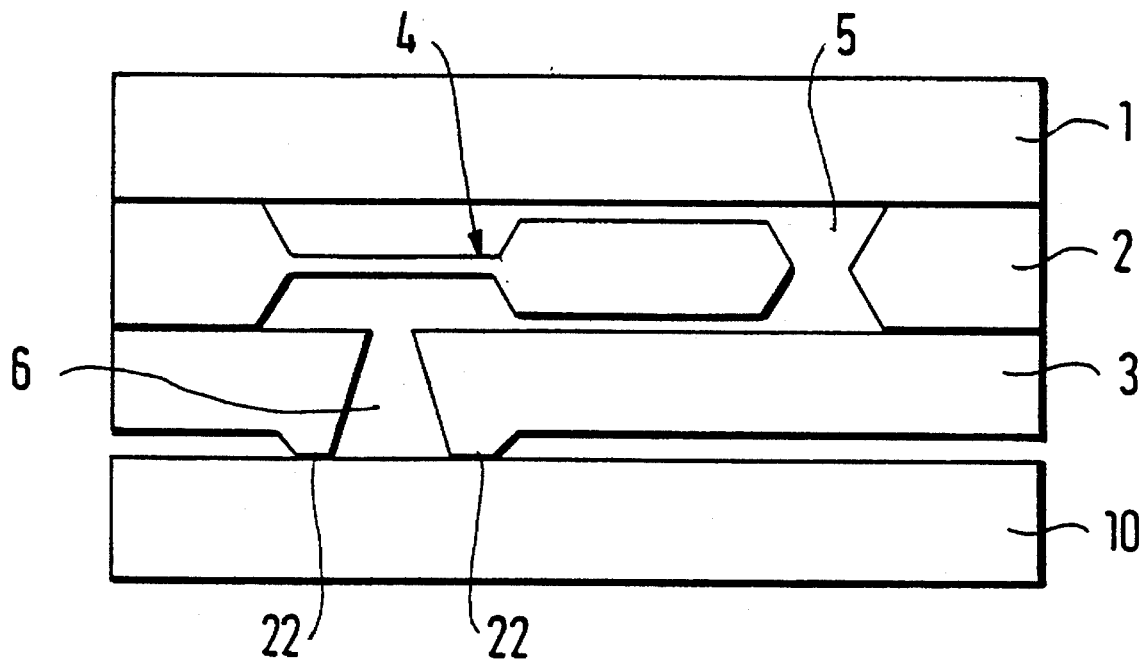
FIG. 5 shows an acceleration sensor with a reduced connection area raised on the surface of the outer plate.

In FIG. 5, another embodiment for an acceleration sensor is shown, which likewise has a connection region 22 in the immediate neighborhood of the hole 6. Numbers 1 through 7 again show the same sensor parts as in FIG. 1. A connection region 22 is located outward from the outer plate 3, with which the outer plate 3 is connected with the additional plate 10. By means of this connection region 22, the same advantages in regard to the thermal behavior of the sensors are achieved as in FIGS. 3 and 4. With the configuration of the acceleration sensor shown in FIG. 5, however, the requirements for precise positioning of the additional plate 10 with respect to the outer silicon plate 3 are extremely small. By this step, the production process for making the acceleration sensor is simplified.

While the present invention has been described in relation to the embodiments described above, it is also envisioned that other embodiments may fall within the scope of the present invention, in particular that the plates may be made of materials other than silicon with similar properties. It is also envisioned that the acceleration sensor body need not be made from three plates, but rather fashioned from a single piece of material or from a different number of layers.

What is claimed is:

1. An acceleration sensor, comprising:

a first outer silicon plate;

a second outer silicon plate, at least one of the first outer silicon plate and the second outer silicon plate having a hole therethrough;

a middle silicon plate located between the first outer silicon plate and the second outer silicon plate, the first outer silicon plate, the middle plate and the second outer silicon plate defining a hollow space, the hollow space being aligned with the hole, the middle plate having an acceleration-sensitive moveable element disposed within the hollow space; and an additional plate connected to one of the first outer silicon plate and the second outer silicon plate for closing the hole in an air-tight manner.

2. The acceleration sensor as recited in claim 1 wherein the additional plate is made of glass.

3. The acceleration sensor as recited in claim 1 wherein the additional plate comprises a silicon plate and a thin layer of glass on a surface of the silicon plate facing the hole.

4. The acceleration sensor as recited in claim 1 wherein the additional plate comprises a silicon plate with a solder layer.

5. The acceleration sensor as recited in claim 4 wherein the solder layer comprises a series of metallic layers.

6. The acceleration sensor as recited in claim 5 wherein the series of metallic layers are made of layers of chromium, nickel, and gold.

7. The acceleration sensor as recited in claim 1 further comprising a casing, the casing being connected to the additional plate.

8. The acceleration sensor as recited in claim 1, wherein the additional plate is connected to the one of the first outer silicon plate and the second outer silicon plate only in a connection region around the hole.

9. The acceleration sensor as recited in claim 8 wherein the entire surface of the additional plate forms the connection region.

10. The acceleration sensor as recited in claim 8 wherein the connection region is a raised region on the additional plate.

11. The acceleration sensor as recited in claim 8, wherein the connection region is a raised region on the one of the first outer silicon plate and the second outer silicon plate that is connected to the additional plate.

12. The acceleration sensor as recited in claim 1 wherein the hollow space has a low pressure therein.

* * * * *